(12) United States Patent
Wheeler et al.

(10) Patent No.: US 6,415,515 B1
(45) Date of Patent: Jul. 9, 2002

(54) SYSTEM, APPARATUS, AND METHOD FOR BLADE CLEARANCE TUNING

(75) Inventors: Dale K. Wheeler, Fallston; William R. Lessig, III, Monkton, both of MD (US)

(73) Assignee: The Black & Decker Corporation, Towson, MD (US)

( * ) Notice: Subject to any disclaimer, the term of this patent is extended or adjusted under 35 U.S.C. 154(b) by 0 days.

(21) Appl. No.: 09/475,069

(22) Filed: Dec. 30, 1999

(51) Int. Cl.⁷ .......................... B26B 19/02; B26B 19/22
(52) U.S. Cl. .................. 30/208; 30/209; 83/699.21; 83/698.41; 29/434; 403/188
(58) Field of Search .................... 29/434; 83/665, 83/666, 698.41, 699.21; 30/208, 209, 502; 403/388, 188, 192, 194

(56) References Cited

U.S. PATENT DOCUMENTS

| | | | |
|---|---|---|---|
| 2,275,180 A | | 3/1942 | Holsclaw |
| 2,465,694 A | * | 3/1949 | Norwood |
| 3,200,493 A | | 8/1965 | Dodegge ..................... 30/216 |
| 3,355,200 A | * | 11/1967 | Storch |
| 3,579,827 A | | 5/1971 | Grahn et al. .................. 30/144 |
| 3,798,768 A | * | 3/1974 | Cowley et al. |
| 4,075,760 A | | 2/1978 | Germain ....................... 30/220 |
| 4,378,636 A | * | 4/1983 | Wick |
| 4,473,947 A | * | 10/1984 | Ishida et al. |
| 4,648,464 A | * | 3/1987 | Huxley |
| 4,868,988 A | | 9/1989 | Han ............................. 30/210 |
| 4,979,303 A | | 12/1990 | Han ............................. 30/210 |
| 5,075,972 A | | 12/1991 | Huang .......................... 30/216 |
| 5,153,996 A | * | 10/1992 | Kuzarov et al. |
| 5,689,887 A | | 11/1997 | Heywood et al. ............. 30/220 |
| 5,771,583 A | | 6/1998 | Kremsler et al. ............. 30/216 |
| 6,131,291 A | * | 10/2000 | Mock |

* cited by examiner

Primary Examiner—S. Thomas Hughes
Assistant Examiner—Eric Compton
(74) Attorney, Agent, or Firm—Foley & Lardner

(57) ABSTRACT

When connecting two elements that are moveable with respect to one another, some amount of clearance, i.e., spacing between the elements, is included to minimize friction between the elements. The present invention is directed to setting the clearance within a desired range, regardless of manufacturing tolerances of the two elements. In particular, the present invention is directed to power cutting tools wherein it is necessary to set the clearance between one or more reciprocating blades and a blade support member.

13 Claims, 3 Drawing Sheets

SYSTEM, APPARATUS, AND METHOD FOR BLADE CLEARANCE TUNING

BACKGROUND OF THE INVENTION

1. Field of the Invention

The present invention is generally directed to setting the spacing between two elements that are moveable with respect to one another. This spacing is commonly referred to as the "clearance" between the elements. Some amount of clearance, i.e., within a desired range, is included to minimize friction between the elements. However, manufacturing tolerances and conventional assembly techniques can result in deviations outside the desired range of clearance.

In particular, the present invention is directed to power cutting tools wherein it is necessary to set the clearance between one or more moving, e.g., reciprocating, blades and a blade support member. The term "power cutting tool" includes hand-held power tools such as a hedge trimmers, as well as mechanisms which are not hand-held but whose operation is controlled by the hands of a user, e.g., a lawn mower.

2. Description of the Related Art

In order to perform a desired task using a cutting tool, it is important that the relatively moving blade or blades be separated from each other or from a relatively stationary blade by an optimum clearance for accomplishing the task efficiently.

Conventionally, blade clearance for cutting tools is preset by the manufacturer. Alternatively, it is known to use a spring mechanism to force relative contact between the blades. It is also known to use jam nuts to periodically adjust the clearance. However, many non-professional users do not know how or take the time to make the necessary adjustments.

Examples of known cutting devices associated with reciprocating blades include U.S. Pat. No. 5,771,583 to Kremsler et al., U.S. Pat. No. 5,689,887 to Heywood et al., U.S. Pat. No. 5,075,972 to Huang, U.S. Pat. Nos. 4,879,303 and 4,868,988 to Han, U.S. Pat. No. 4,075,760 to Germain, U.S. Pat. No. 3,579,827 to Grahn, U.S. Pat. No. 3,200,493 to Dodegge, and U.S. Pat. No. 2,275,180 to Holsclaw.

SUMMARY OF THE INVENTION

An object of the present invention is to set, within a desired range, the clearance between first and second elements that are constrained to a prescribed relative motion. Thus, it is a further object of the present invention to constrain the first and second elements to the prescribed relative motion while maintaining friction in a desired range. It is yet a further object of the present invention to set an optimal range for the clearance between the first and second elements.

An advantage of the present invention is that the need for grinding blades to give tighter control of their thickness is eliminated.

The above objects and advantages, as well as other objects and advantages that will become clear from the following description of the present invention, are realized by a system for setting a clearance between relatively movable elements. The system comprises a first element; a second element relatively movable with respect to the first element; and a third element penetrating the second element along an axis, the third element being fixed against axial displacement with respect to the first element. The third element having a first axial portion extending a first dimension along the axis between first and second axial ends, the first dimension exceeding a thickness of the second element along the axis, and a second axial portion being connected to the first axial portion at the second axial end and having an enlarged radial dimension relative to the first portion, the second element being interposed between the first element and the second portion. Whereby the first axial end extends into a depression in the first element a second dimension that is less than the difference between the first dimension and the thickness.

The above objects and advantages, as well as other objects and advantages that will become clear from the following description of the present invention, are also realized by a system for setting blade clearance in a power cutting tool. The system comprises a blade support member; a first cutting blade relatively movable with respect to the blade support member; a second cutting blade relatively moveable with respect to the blade support member and with respect to the first cutting blade; and a spacer penetrating the first and second cutting blades along an axis, the spacer being fixed against axial displacement with respect to the blade support member. The spacer having a first axial portion extending a first dimension along the axis between first and second axial ends, the first dimension exceeding a combined thickness of the first and second cutting blades along the axis, and a second axial portion being connected to the first axial portion at the second axial end and having an enlarged radial dimension relative to the first portion, the first and second cutting blades being interposed between the blade support member and the second portion. Whereby the first axial end extends into a depression in the blade support member a second dimension that is less than the difference between the first dimension and the combined thickness.

The above objects and advantages, as well as other objects and advantages that will become clear from the following description of the present invention, are also realized by an apparatus for setting a clearance between relatively movable elements connected by a spacer having a flange. The apparatus comprises a first jaw adapted for engaging a first one of the relatively movable elements; a second jaw including a surface adapted for engaging a second one of the relatively movable elements, the surface having a recess adapted for engaging the flange; and a press moving the first and second jaws toward one another. Wherein the second jaw is adapted for displacing the spacer to deform the first one of the relatively moveable elements, and the surface is adapted for stopping spacer displacement by engaging the second one of the relatively movable elements.

The above objects and advantages, as well as other objects and advantages that will become clear from the following description of the present invention, are also realized by a method of setting a clearance between relatively movable elements. The method comprises orienting adjacent first and second relatively movable elements against a first press jaw; inserting a third element along an axis extending through an aperture in the second element, the third element including a first axial portion extending a first dimension along the axis between first and second axial ends, the first dimension exceeding a thickness of the second element along the axis, and a second axial portion being connected to the first axial portion at the second axial end and having an enlarged radial dimension relative to the first portion, the second element being interposed between the first element and the second portion; aligning a second press jaw against the third element and in opposition to the first press jaw; pressing the third element along the axis against the first element; deforming the first element with the first axial end so as to create a depression extending into the first element a second dimension; whereby axial clearance between the first element, the second element, and the second portion is equal to the first dimension less a combined total of the thickness and the second dimension.

These and other objects and advantages of the present invention are set forth in the description that follows, and in part will be readily apparent to those skilled in the art from the description and drawings, or can be learned by practice of the invention. These objects and advantages of the invention can be realized and obtained by means of the instrumentalities and combinations particularly pointed out in the appended claims.

BRIEF DESCRIPTION OF THE DRAWINGS

The following detailed description of preferred embodiments according to the present invention refer to the accompanying drawings, wherein identical numerals indicate like parts.

DETAILED DESCRIPTION OF THE PREFERRED EMBODIMENT

Figure 1:
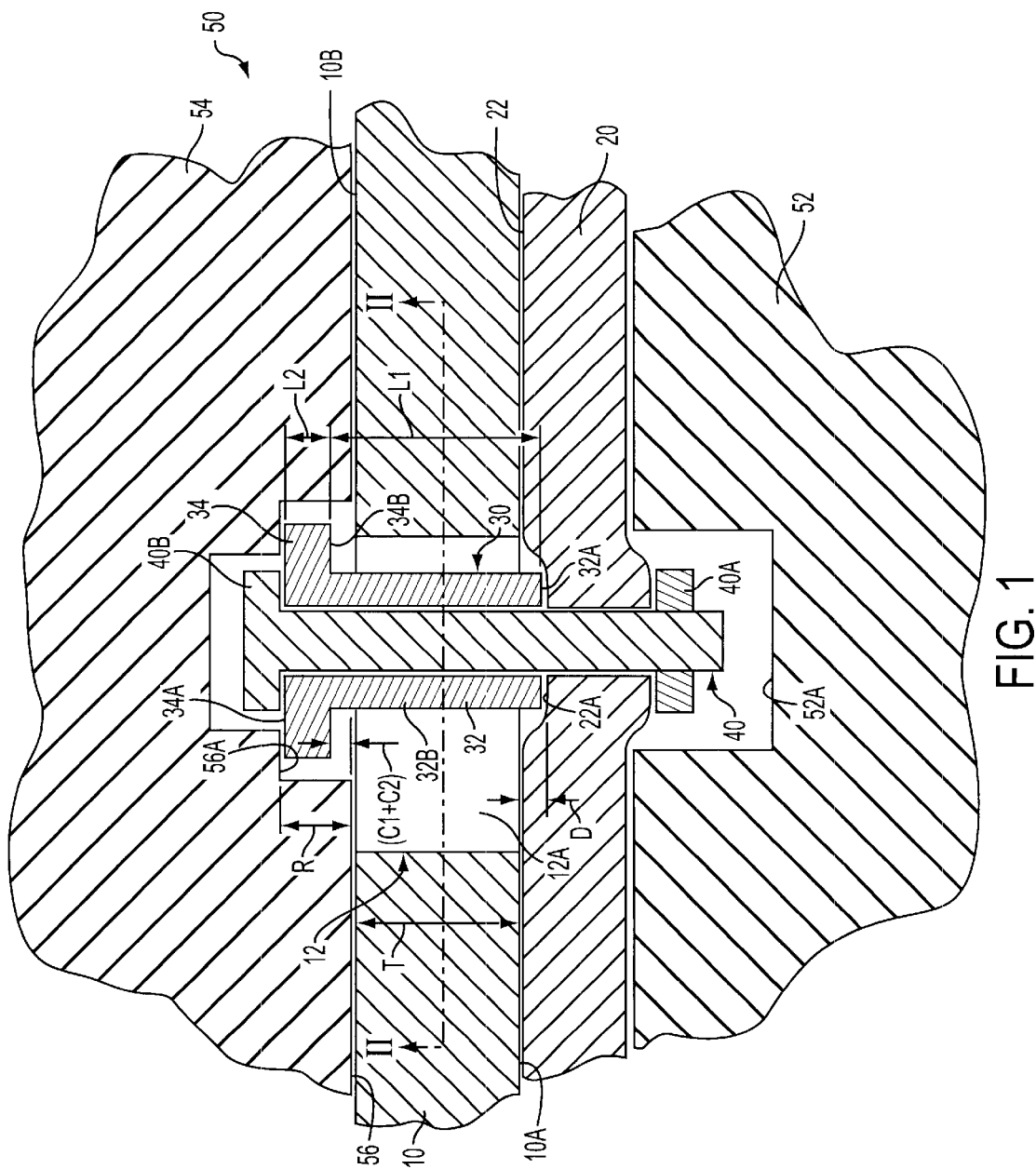
FIG. 1 schematically illustrates a first preferred embodiment of the present invention.
Figure 2:
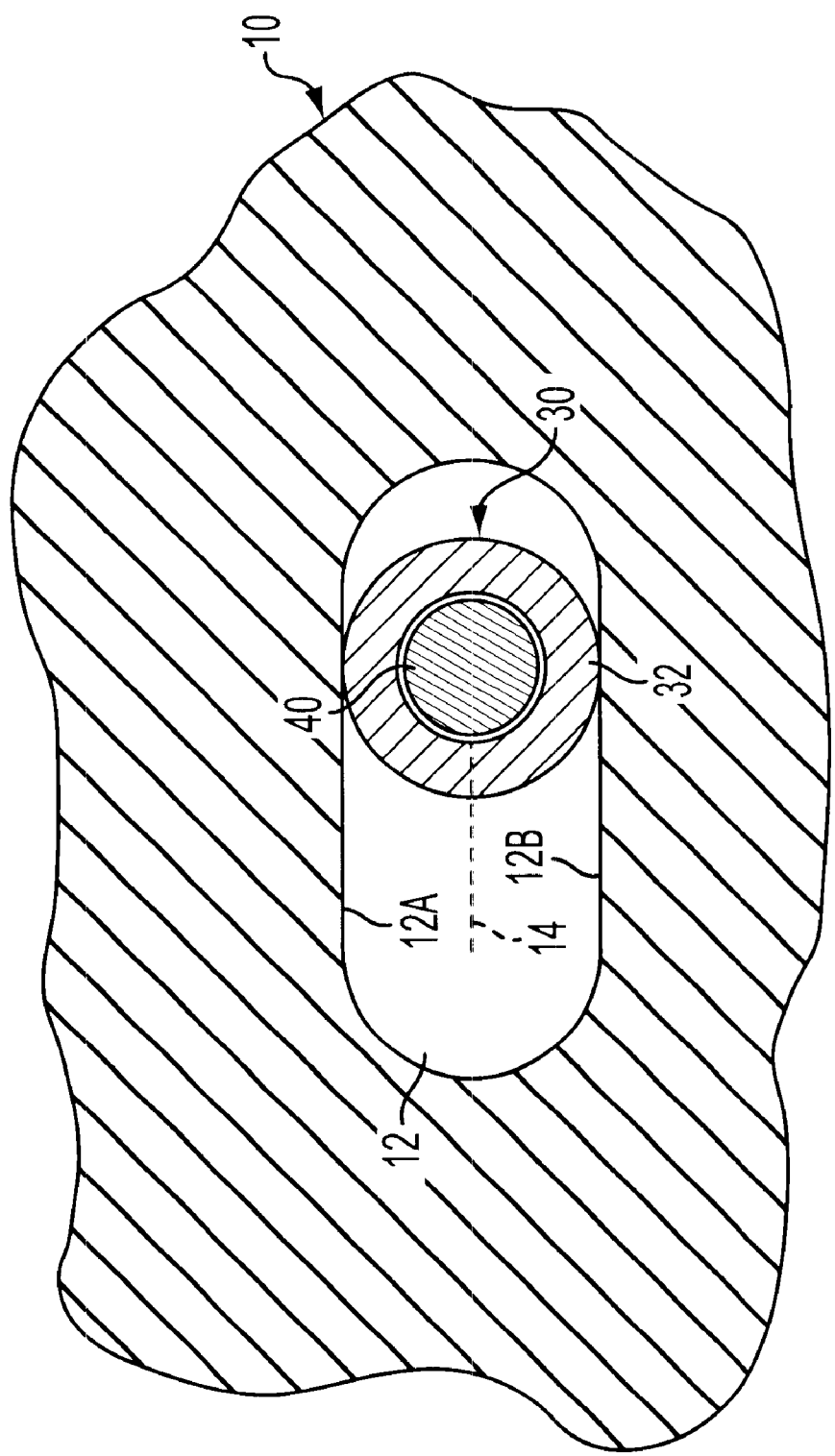
FIG. 2 is a cross-section view taken along line II—II on FIG. 1.

Referring initially to FIGS. 1 and 2, a blade 10 is relatively movable with respect to a blade support member 20 supporting the blade 10. A spacer 30 constrains the relative movement of the blade 10 with respect to the blade support member 20 to a prescribed path. A fastener 40 can secure the spacer 30 to the blade support member 20.

According to a preferred embodiment of the present invention, the blade 10 includes an aperture 12 that extends through the blade 10 from a first surface 10A to a second surface 10B. The shape of the aperture 12 at its intersection with the surfaces 10A or 10B can be a circle, a polygon, or any other shape. According to a most preferred embodiment, the aperture 12 includes an elongated slot having a pair of substantially parallel major sides 12A and 12B. The locus of midpoints between the sides 12A, 12B define a path 14 that can be linear, curvilinear, or a combination of linear and curvilinear segments.

According to a preferred embodiment of the present invention, the blade 10 is supported for reciprocal movement with respect to the blade support member 20. The blade support member 20 includes a face 22 generally confronting the surface 10A. In the present disclosure, the expression "support member" refers to any three dimensional element including, but not limited to a sheet of material having a generally planar, convex, or concave topography, a partial or complete enclosure, or a solid body.

According to a preferred embodiment of the present invention, the spacer 30 penetrates the blade 10 by extending through the aperture 12. According to a most preferred embodiment, the spacer 30 includes a first portion 32 and a second portion 34. The first portion 32 has a first end 32A contiguously contacting the face 22 and a second end 32B connected to the second portion 34. A cross-sectional dimension of the first portion 32, e.g., the diameter of a circle, generally corresponds to the distance between the sides 12A, 12B. Thus, relative movement of the blade 10 with respect to the blade support member 20 is constrained to movement along the path 14 without significant lateral deviation toward either of the sides 12A, 12B. The second portion 34 has a larger cross-sectional dimension than that of the first portion 32. Thus, the blade 10 is sandwiched between the second portion 34 and the blade support member 20. According to a most preferred embodiment of the present invention, the first and second portions 32, 34 are configured as coaxial right circular cylinders, with the second portion 34 having a larger diameter than the first portion 32.

According to a preferred embodiment of the present invention, the length of the first portion 32, i.e., from the first end 32A to the second end 32B, is greater than the thickness of the blade 10, i.e., from the first surface 10A to the second surface 10B. According to a most preferred embodiment of the present invention, the first end 32A is received in a depression 22A in the face 22. Referring to FIG. 1, the length of the first portion 32 is L1, the depth of the depression 22A is D, the thickness of the blade 10 is T, the clearance between the surface 10A and the face 22 is C1, and the clearance between the surface 10B and the second portion 34 is C2. Thus, the sum of the clearances between the blade 10, the face 22, and the second portion 34 is set to be the difference between the thickness of the blade 10 and the length of the first portion 32 less the depth of the depression 22A relative to the face 22. This relationship is expressed in Equation (1).

$$(C1+C2)=(L1-D)-T \tag{1}$$

Thus, according to the present invention, the sum of the clearances (C1+C2) is not affected by deviations in the blade thickness T or the first portion length L1 inasmuch as the depression depth D is adjusted to account for these deviations.

The sum of the clearances (C1+C2) is set by a preferred apparatus 50 according to the present invention. The apparatus 50 includes a first jaw 52 and a second jaw 54 that are driven toward one another in a pressing operation. The first jaw 52 engages the blade support member 20 and provides a reaction force against the force used to form the depression 22A. The first jaw 52 can include a recess 52A for defining the boundary of the depression 22A or for freely accommodating a first terminus 40A of the fastener 40. The second jaw 54 includes a face 56 having a recess 56A that engages a pressing end 34A of the second portion 34 for pressing the spacer 30 against the face 22 in order to form the depression 22A. The recess 56A can also freely accommodate a second terminus 40B of the fastener 40. The first terminus can include threads which threadably engage a nut.

According to a preferred embodiment of the present invention, the depth of the recess 56A relative to the face 56 is greater than the length of the second portion 34, i.e., from the pressing end 34A to a shoulder end 34B at the connection to the second end 32B of the first portion 32. Referring to FIG. 1, the depth of the recess 56A is R, and the length of the second portion 34 is L2. Thus, the sum of the clearances between the blade 10, the face 22, and the second portion 34 is set to be the difference between the length of the second portion 34 and the depth of the recess 56A. This relationship is expressed in Equation (2).

$$(C1+C2)=R-L2 \tag{2}$$

Thus, variations within the desired range for the sum of the clearances (C1+C2) depend solely on the manufacturing tolerances of the recess depth R and the second portion length L2, which are more easily controlled than the manufacturing tolerance of the blade thickness T.

The desired range of values for the sum of the clearances (C1+C2) can be more precisely controlled according to a preferred method of the present invention. Initially, the spacer 30 is extended through the aperture 12 and the blade 10 is arranged adjacent to the blade support member 20. Thus, the first end 32A of the spacer 30 confronts the undeformed face 22 of the blade support member 20. The first jaw 52 is brought into engagement with the blade support member 20 to provide a reaction force opposing the force forming the depression 22A, which is applied by the second jaw 54 against the pressing end 34A of the spacer 30. The first and second jaws 52, 54 are pressed toward one another such that the spacer 30 deforms the blade support member 20, i.e., forms the depression 22A. The depression 22A is completely formed when the face 56 of the jaw 54 engages the surface 10B of the blade 10. Finally, the first and second jaws 52, 54 are withdrawn from one another. The sum the clearances (C1+C2) is established within a desired range that is independent of variations in blade thickness T or first portion length L1.

Of course, numerous variations can be practiced within the scope of the present invention. Rather than facilitating a relative reciprocating motion between the blade 10 and the blade support member 20, the present invention can facilitate relative rotating or pivoting motion between the blade 10 and the blade support member 20. The spacer 30 can be fixed to the blade 10 and pass through an aperture in the blade support member 20. The first portion 32 or the second portion 34 of the spacer 30 can have any cross-sectional shape, i.e., they need not be circular. The depression 22A can be formed by a hot pressing operation, e.g., heating the spacer 30 so as to melt and/or soften a portion of the blade support member 20. Such a hot pressing operation can be performed in place of or in addition to the cold pressing operation described above. Rather than having the aperture 12 penetrating an interior portion of the blade 10, the spacer 30 can cooperatively engage an edge of the blade 10.

Additional blades can be supported by a single spacer 30 for relative motion with respect to the blade 10 and to the blade support member 20. Because the amount of blade clearance according to the present invention is not affected by variations in blade thickness, a common spacer 30 can connect any number of relatively moving blades and a blade support member.

Figure 3:
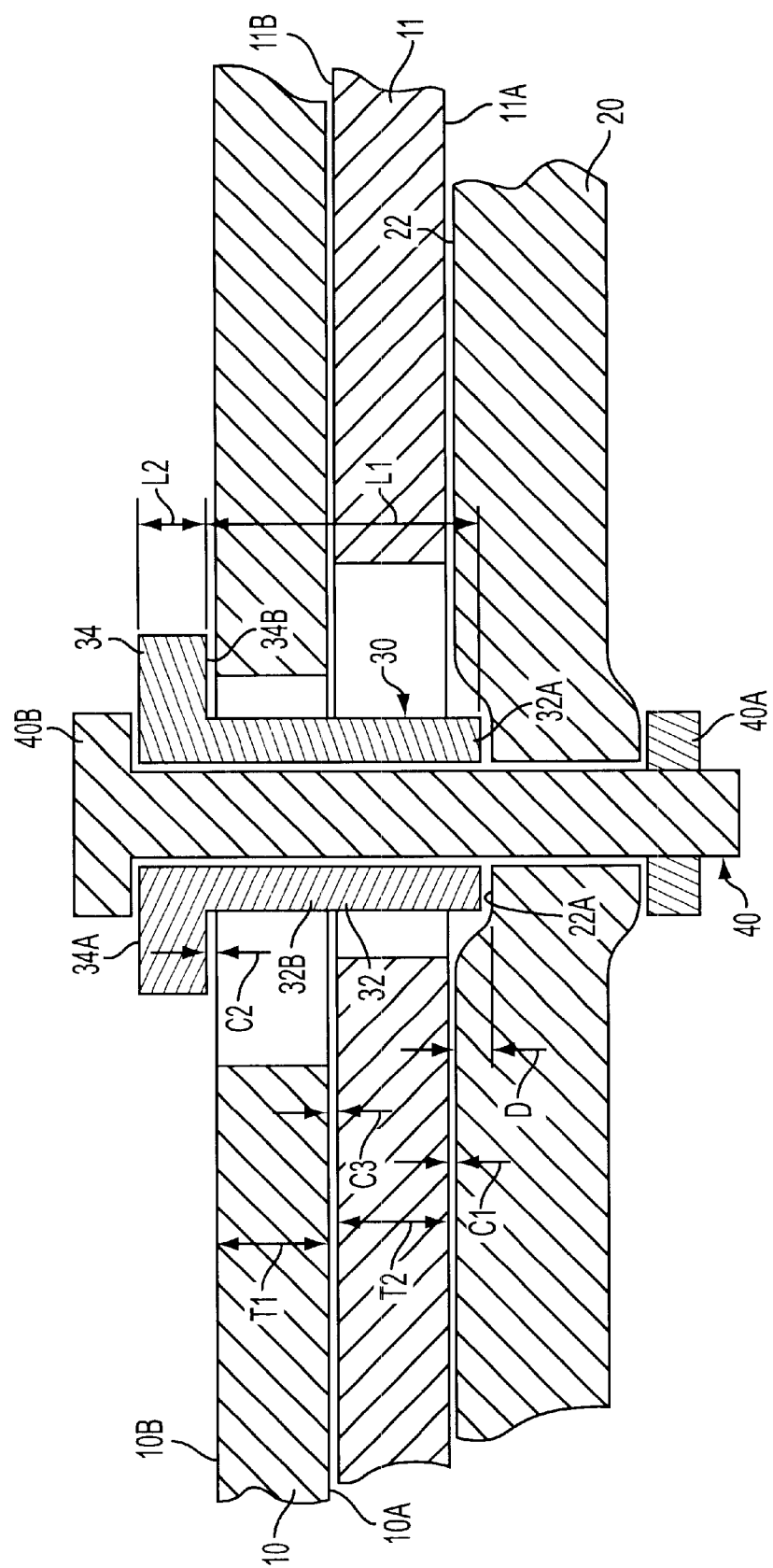
FIG. 3 schematically illustrates a second preferred embodiment of the present invention.

Specifically, FIG. 3 illustrates a first blade 10 and a second blade II that are each relatively translatable with respect to the blade support member 20. The second blade 11 is sandwiched between first blade 10 and the blade support member 20 such that a first surface 11A of the second blade 11 generally confronts the face 22 of the blade support member 20, and a second surface 11B of the second blade 11 generally confronts the first surface 10A of the first blade 10.

The spacer 30 penetrates the second blade 11 in substantially the same manner as the first blade 10. The length L1 of the first portion 32 of the spacer 30 is greater than the combined thicknesses of the first and second blades 10, 11, i.e., the sum of the distances from the surface 10A to surface 10B and from the surface 11A to the surface 11B. Referring to FIG. 3, the length of the first portion 32 is L1, the depth of the depression 22A is D, the thickness of the first blade 10 is T1, the thickness of the second blade 11 is T2, the clearance between the face 22 and the surface 11A is C1, the clearance between the second portion 34 of the spacer 30 and surface 10B is C2, and the clearance between the surfaces 10A and 11B is C3. Thus, the sum of the clearances between the face 22, the second blade 10, the first blade 11, and the second portion is set to be the difference between the combined thicknesses of the first and second blades 10, 11 and the length of the of the first portion 32 less the depth of depression 22A. This relationship is expressed in Equation (3).

$$(C1+C2+C3)=(L1-D)-(T1+T2) \quad (3)$$

Thus, according to the present invention, the sum of the clearances (C1+C2+C3) is not affected by deviations in the blade thickness (T1+T2) or the first portion length L1 inasmuch as the depression depth D is adjusted to account for these deviations.

The identical reference numbers are used to indicate features in FIG. 3 that are the same as in FIG. 1. A duplicate description of these features is omitted with regard to this second embodiment. Moreover, the embodiment shown in FIG. 3 can be practiced in accordance with the same apparatus 50 and the same method of fabrication described with reference to FIG. 1.

According to the preferred embodiments, apparatuses, and methods of the present invention, it is possible to provide a more precisely controlled amount of blade clearance. For example, the manufacturing tolerance for a blade is approximately ±0.0025 inches and the manufacturing tolerance for a spacer is approximately ±0.004 inches. Thus, for a conventional two-blade cutting tool, the variation of the clearance is ±0.009 inches. In contrast, the manufacturing tolerance for the recess 56A according to the present invention is approximately ±0.001 inches; however, the effect of the manufacturing tolerance for the blades is eliminated. Thus, for the two-blade cutting tool shown in FIG. 3, the variation of the clearance is ±0.005 inches. This reduction in the variation of the clearance greatly improves cut quality.

Additional advantages and modifications will readily occur to those skilled in the art. Therefore, the invention in its broader aspects is not limited to the specific details and representative devices, shown and described herein. Accordingly, various modifications can be made without departing from the spirit and scope of the general inventive concept as defined by the appended claims and their equivalents.

We claim:

1. A system for setting a clearance between relatively movable elements, the system comprising:
   a first element;
   a second element relatively movable with respect to said first element; and
   a third element penetrating said second element along an axis, said third element being fixed against axial displacement with respect to said first element, and said third element having:
     a first axial portion extending a first dimension along said axis between first and second axial ends, said first dimension exceeding a thickness of said second element along said axis, and
     a second axial portion being connected to said first axial portion at said second axial end and having an enlarged radial dimension relative to said first portion, said second element being interposed between said first element and said second portion;
   whereby said first axial end extends into a depression in said first element, said depression having a second dimension that is less than the difference between said first dimension and said thickness by a specified amount,
   wherein a tolerance of said specified amount is substantially independent of a tolerance of said thickness.

2. The system according to claim 1, wherein said second axial portion includes a flange extending orthogonally with respect to said axis.

3. The system according to claim 1, wherein axial clearance between said first element, said second element, and said second portion is equal to said first dimension less a combined total of said thickness and said second dimension.

4. The system according to claim 3, wherein said axial clearance is said specified amount.

5. The system according to claim 1, further comprising:
a fastener fixing said third element to said first portion.

6. The system according to claim 5, wherein said fastener includes a bolt threadably engaging a nut.

7. The system according to claim 1, wherein said first element includes a substantially planar major surface and said depression includes a dimple in said major surface.

8. The system according to claim 1, further comprising:
a fourth element relatively movable with respect to said first and second elements;
whereby said third element penetrates said second and fourth elements along said axis.

9. The system according to claim 1, wherein said tolerance of said specified amount is approximately ±0.005 inches.

10. A system for setting blade clearance in a power cutting tool, the system comprising:
a blade support member;
a first cutting blade relatively movable with respect to said blade support member;
a second cutting blade relatively moveable with respect to said blade support member and with respect to said first cutting blade; and
a spacer penetrating said first and second cutting blades along an axis, said spacer being fixed against axial displacement with respect to said blade support member, and said spacer having:
a first axial portion extending a first dimension along said axis between first and second axial ends, said first dimension exceeding a combined thickness of said first and second cutting blades along said axis, and
a second axial portion being connected to said first axial portion at said second axial end and having an enlarged dimension relative to said first portion, said first and second cutting blades being interposed between said blade support member and said second portion;
whereby said first axial end extends into a depression in said blade support member, said depression having a second dimension that is less than the difference between said first dimension and said combined thickness by a specified amount,
wherein a tolerance of said specified amount is substantially independent of a tolerance of said combined thickness.

11. The system according to claim 10, further comprising:
a fastener fixing said spacer to said blade support member, said fastener including a bolt threadably engaging a nut.

12. The system according to claim 10, wherein said second cutting blade is sandwich between said blade support member and said first cutting blade.

13. The system according to claim 3, wherein said axial clearance is said specified amount.

* * * * *